United States Patent [19]

Stark

[11] 4,220,215
[45] Sep. 2, 1980

[54] A-FRAME FOR CARRYING LOADS ON A LOADER

[75] Inventor: Sheldon L. Stark, Eureka, Ill.

[73] Assignee: Caterpillar Tractor Co., Peoria, Ill.

[21] Appl. No.: 60,708

[22] Filed: Jul. 26, 1979

Related U.S. Application Data

[63] Continuation of Ser. No. 813,724, Jul. 7, 1977, abandoned.

[51] Int. Cl.² ............................................. B62D 11/00
[52] U.S. Cl. .................................... 180/6.7; 172/776; 414/685
[58] Field of Search ..................... 180/6.7, 9.2 R, 900, 180/6.2, 6.48; 296/187; 414/685, 697; 172/776

[56] References Cited

U.S. PATENT DOCUMENTS

| | | | |
|---|---|---|---|
| 2,955,845 | 10/1960 | Carroll | 180/6.48 |
| 3,656,642 | 4/1972 | Kostas | 214/140 |
| 3,767,254 | 10/1973 | Skanes | 296/28 R |
| 3,873,148 | 3/1975 | Kennicuit | 296/28 R |
| 3,878,912 | 4/1975 | Samatov | 180/9.2 R |
| 3,924,702 | 12/1975 | Heggen | 296/28 R |

*Primary Examiner*—John J. Love
*Assistant Examiner*—John A. Carroll
*Attorney, Agent, or Firm*—Phillips, Moore, Weissenberger, Lempio & Majestic

[57] ABSTRACT

A main frame for a track-type loader vehicle including a pair of implement supporting towers attached to horizontal rails of box construction which support pivot shafts of track roller frames and final drives of a hydrostatic drive system. Each tower includes two upright members with one member of A-frame construction having three legs of box construction arranged in a triangular shape and a wall common to all of the legs. One leg is located on one side of the wall, another leg is located at an edge of the wall adjacent the horizontal rail, and the third leg is on the other side of the wall. The two upright members support a lift arm for a loader bucket and a cylinder for lifting the lift arm, while the one upright member also carries an equalizer bar support.

5 Claims, 8 Drawing Figures

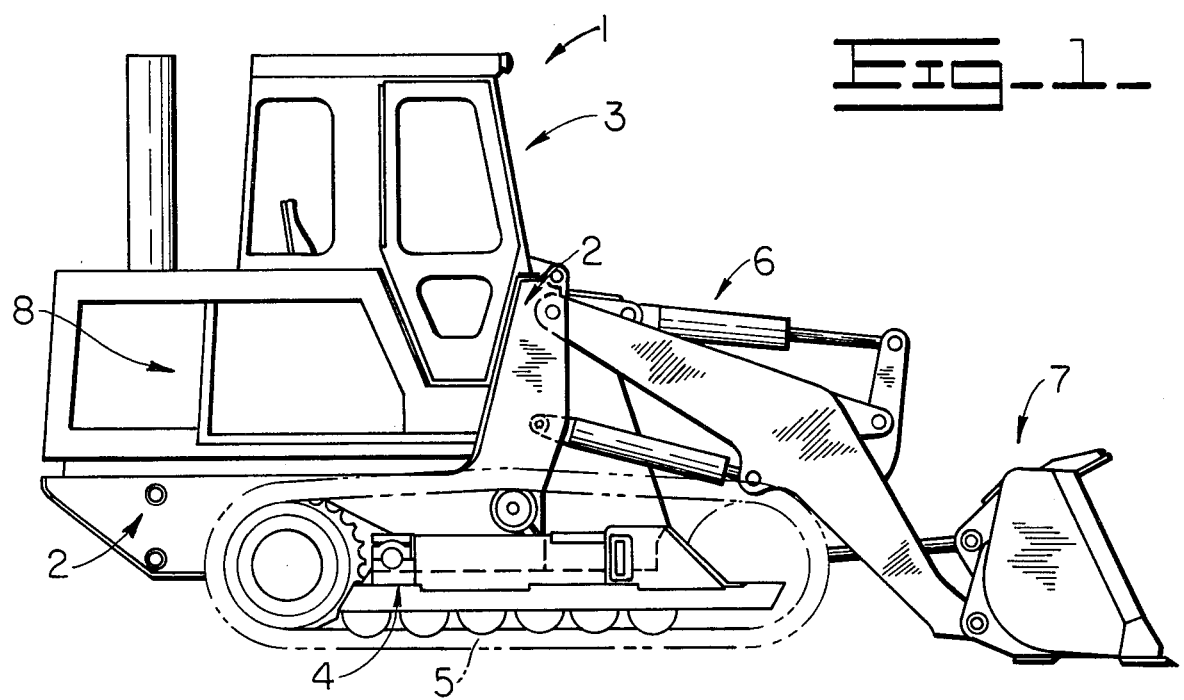
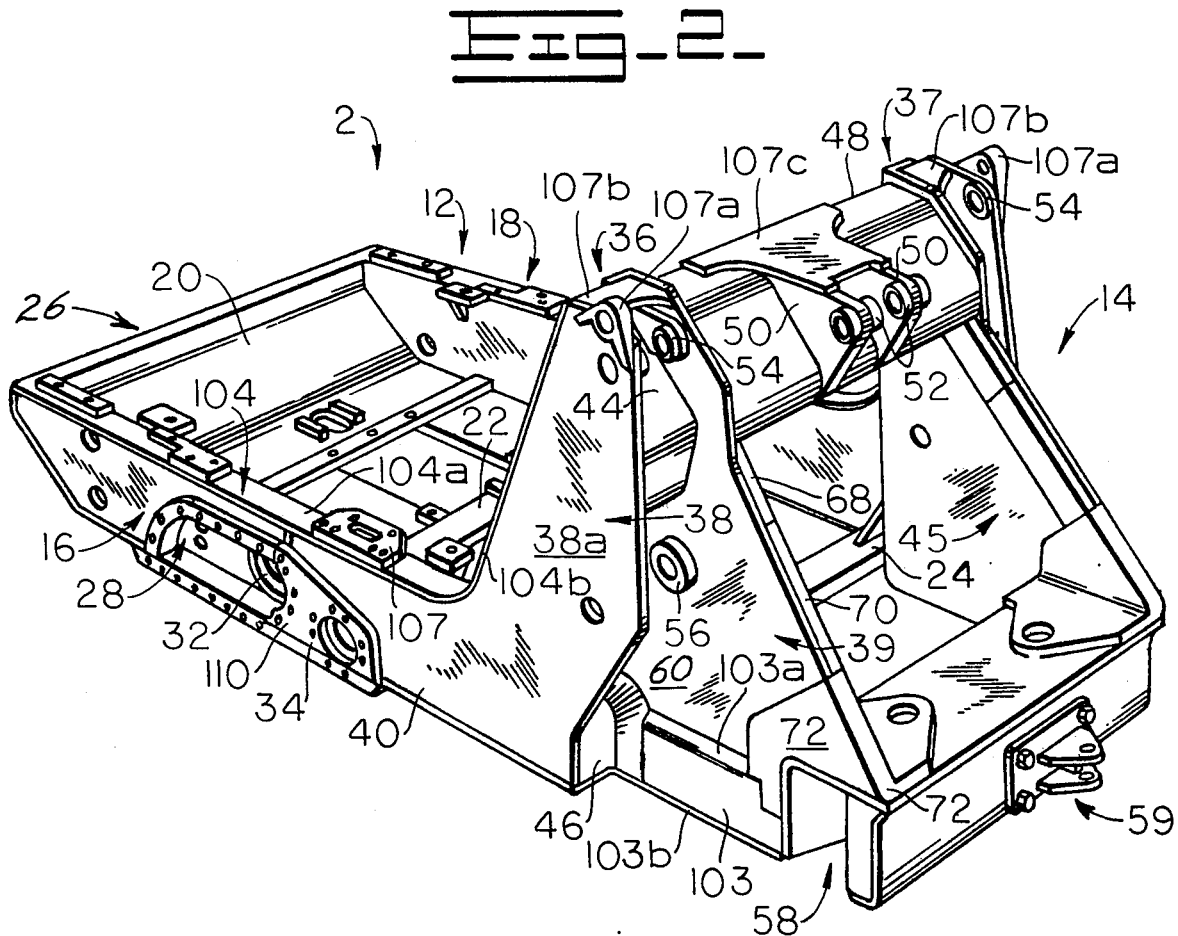

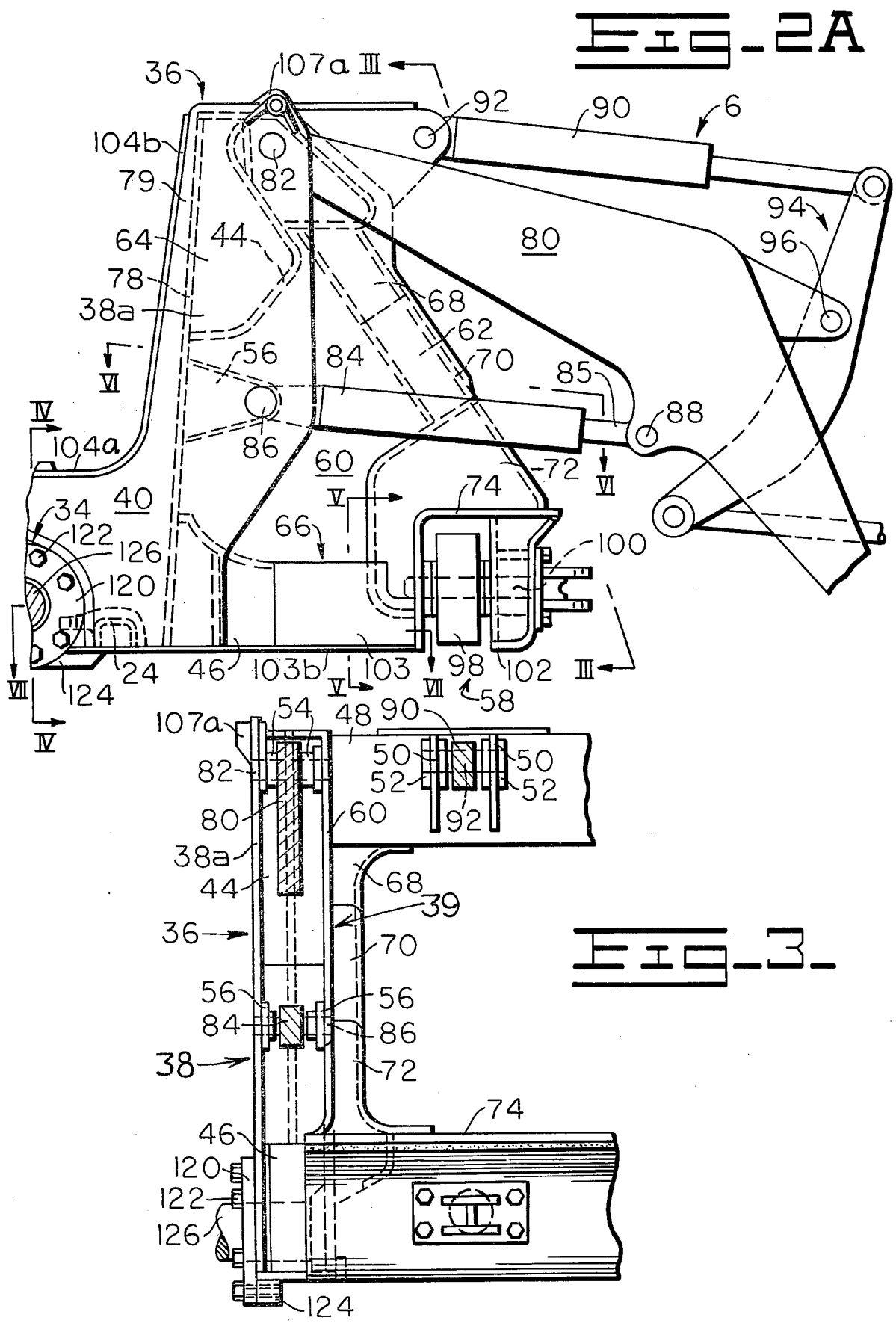

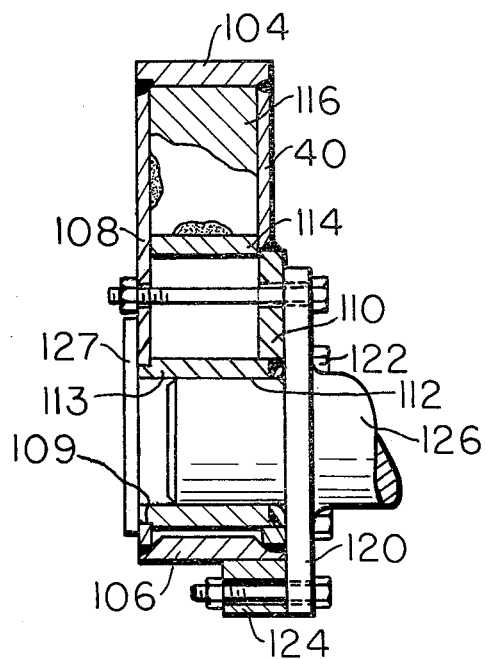
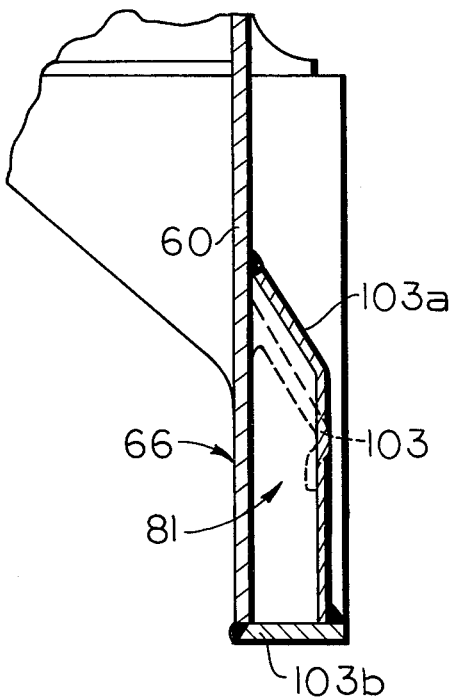
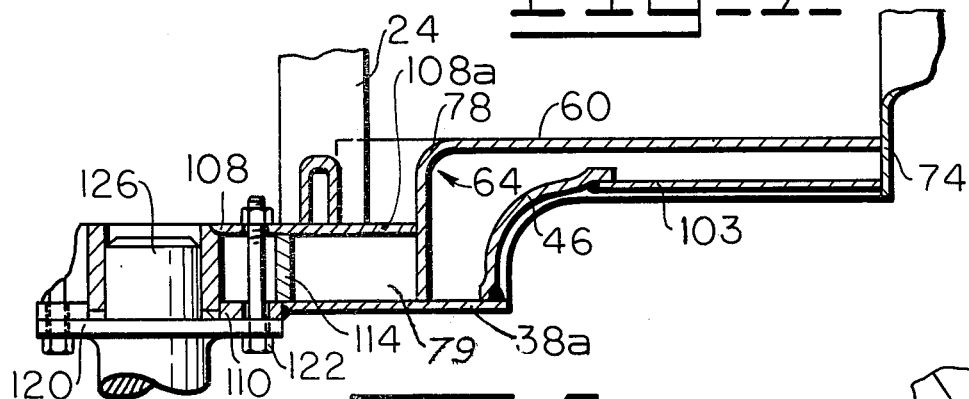
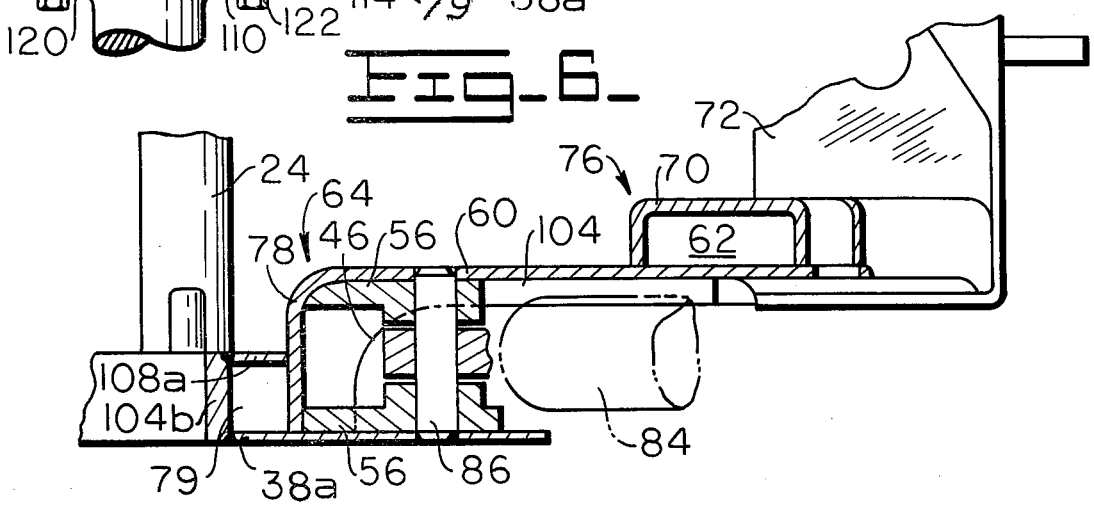

A-FRAME FOR CARRYING LOADS ON A LOADER

This is a continuation of Ser. No. 813,724, filed July 7, 1977.

BACKGROUND OF THE INVENTION

This invention relates to a rigid frame for a vehicle and, more particularly, to a loader tower for carrying loads on one end of a vehicle such as a track-type loader having the usual track roller frames and equalizer bar.

Conventional earthmoving vehicles, such as track-type loaders, typically include, for example, loader buckets for moving the earth. These implements are secured to one end of a main frame having horizontal rails and loader towers, which frame is normally fabricated from a large number of components that are welded together. The implements are mounted to the loader towers to permit lifting and tilting of them for earthmoving purposes. As can be appreciated, these implements can create heavy loading on the frame which is thus subjected to severe stresses that adversely affect the various joints and, particularly, the welds of the frame.

It is apparent that any adverse loading on the frame can result in premature failure of the welds, as well as the components of the frame. This failure is more likely to occur if the loads are concentrated on the frame along a particular path, rather than being distributed along several paths. While heavier components such as heavier plates for carrying and transmitting the loads may be employed to increase the strength of the frame, this has the disadvantage of also increasing the weight and cost of the vehicle.

The problem of premature failure is further aggravated when the implement support arms and lift cylinders are mounted to the loader towers in an offset manner with respect to the horizontal rails of the main frame. This offset implement mounting will create undesirable bending moments in the frame. Moreover, this offset also increases the width of the vehicle which preferably should be kept to a minimum.

The relatively large number of components of the prior frames also result in the need for more welds to join these components, thereby providing more possible failure points and an increase in manufacturing problems, both in terms of costs and tooling. Heretofore, it has been a problem in designing a frame which has fewer parts and welds, yet is of adequate strength without excessive weight to withstand and distribute the implement loads and other loads encountered by the vehicle.

SUMMARY OF THE INVENTION

The present invention is directed to overcoming one or more of the problems as set forth above.

The present invention constitutes a main frame for a loader vehicle having a triangular upright plate including a first forward leg, a second bottom leg and a third rear leg, the improvement comprising a plurality of first plates being shaped to provide a first box section along said first leg, a plurality of second plates being shaped to provide a second box section along said second leg, at least one third plate extending substantially at a right angle to said third leg, and a plurality of fourth plates being shaped to provide a third box section with said third plate.

BRIEF DESCRIPTION OF THE DRAWINGS

FIG. 1 is a side elevational view of a track-type loader vehicle.

FIG. 2 is a perspective view of a main frame for the track-type loader.

FIG. 2A is a side elevational view of the forward portion of the main frame of FIG. 2 and showing the addition of various attachments to the frame.

FIG. 3 is a section taken along lines III—III of FIG. 2A.

FIG. 4 is a section taken along lines IV—IV of FIG. 2A and showing the additional members attached to the frame.

FIG. 5 is a section taken along lines V—V of FIG. 2A.

FIG. 6 is a section taken along lines VI—VI of FIG. 2A.

FIG. 7 is a section taken along lines VII—VII of FIG. 2A.

DETAILED DESCRIPTION OF THE DRAWINGS

With reference to FIG. 1, while the invention will be described in relation to a track-type loader 1, it can also be equally utilized for a wheel-type loader. The loader 1 includes a main frame shown generally at 2, which mounts an operator's cab 3 and track roller frames 4 (one shown) carrying an endless track 5. A linkage 6 is mounted to the front of main frame 2 for lifting and tilting a loader bucket 7, and a vehicle engine 8 mounted to the rear of frame 2. The main frame 2 can also be constructed to mount the linkage 6 to the rear of the vehicle 1 and the engine 8 to the forward end of the vehicle 1.

With reference to FIG. 2, there is shown the integral main frame 2 for a track-type loader having the frame components welded together. The main frame 2 includes a rearwardly extending portion 12 and a forwardly disposed portion 14. The rearwardly disposed portion 12 includes a pair of similarly constructed elongated horizontal side rails 16 and 18 which are in parallel relation about the longitudinal axis of the frame 2 and are interconnected by a plurality of cross-members 20, 22 and 24 each of box section. The rear mounted vehicle engine 8 may be removably secured within a compartment 26 defined by the side rails 16 and 18 and the cross-members 20, 22 and 24.

Each side rail 16 and 18 includes a casing shown generally at 28 (only one shown) which houses the final drive of a hydrostatic drive system (not shown) for transmitting power from the vehicle engine 8 to a track mechanism including the endless track 5 and track roller frame 4. Hydrostatic transmission systems are well known in the art and would include a hydraulic motor coupled in compartment 26 to the side of rail 16 and extending through an aperture 32 therein to the final drive. Alternatively, the drive for the vehicle 1 can equally be a more conventional clutch and brake arrangement. Each of the rails 16 and 18 also has a casing shown generally at 34 (only one shown) for supporting a pivot shaft to which the track roller frames 4 are connected to enable these frames to pivot in a well known manner.

The forwardly disposed portion 14 of the main 2 includes a pair of spaced towers 36 and 37 which mount loader attachments described more fully below. The towers 36 and 37 are designed to distribute these loads substantially evenly along two separate paths of the main frame 2 ultimately to ground, as will be more fully described. Tower 36, and similarly tower 37, includes a pair of upright or vertical members 38,39, with member 38 including a plate 38a common to a side plate 40 of side rail 16 and member 39 being of A-frame construction. Upper cross-members 44 (only one shown) and lower castings 46 (only one shown) interconnect upright members 38 and 39, as well as similar upright members for tower 37. A cross-member 48 interconnects the upper portions of upright 39 of tower 36 and a similar upright 45 of tower 37, and has ears 50, together with bosses 52, for pivotally mounting loader attachments. Bosses 54 are welded to the upper areas of the upright members of towers 36 and 37, respectively, while bosses 56 are welded to the intermediate areas of these towers, respectively, for mounting additional loader attachments, as shown in FIGS. 1-3. A support 58 for an equalizer bar, well known in the art, is welded to the lower area of members 39 and 45 and has connected thereto a clevis shown generally at 59 to allow vehicle 1 to be pulled by another vehicle when, for example, vehicle 1 is stuck or the engine 8 needs sevice.

Reference should now be made to FIGS. 2-3 and 5-7 for a detailed description of the tower 36, bearing in mind that tower 37 is similarly constructed. The upright member 39 includes a common plate or wall 60 having an inclined side leg 62, a substantially vertical side leg 64 and a bottom or horizontally extending base leg 66, the legs 62,64 and 66 being arranged in a triangular shape. The leg 62, in addition to including the plate 60, comprises a U-shaped transition casting 68 welded to cross-member 48 and to plate 60, a U-shaped short form plate 70 welded to casting 68 and plate 60, and another transition casting 72 welded to plates 60 and 70 and to a generally L-shaped plate 74 forming part of the equalizer bar support 58. The leg 62 of upright 36 forms a box-section 76 on one side of wall 60, as indicated in FIG. 6, that functions to strengthen the tower 36 along leg 62. As also shown in FIG. 6, leg 64 includes a flange 78 which is substantially at a right angle to the wall 60 and extends to the plate 38a for forming another box section 79 at the edge of wall 60, as will be further described. It also should be noted from FIG. 5, as will also be further described, that leg 66 is of box construction 81 on the other side of wall 60 from box 76.

With reference to FIGS. 2A and 3, a lift arm 80 of linkage 6 for lifting the loader bucket 7 is pivotally connected to the tower 36 near the intersection of legs 62 and 64 by a pivot pin 82 extending through plate 38a, bosses 54 and the arm 80. A lift cylinder 84 has one end pivotally connected to tower 36 by a pivot pin 86 extending through bosses 56 welded to wall 60 and plate 38a. The other end of cylinder 84 is connected by cylinder rod 85 and a pivot pin 88 to the lift arm 80, whereby extension of the cylinder rod will lift the lift arm 80 to raise the bucket 7. Another lift arm and lift cylinder (not shown) are connected to tower 37.

A tilt cylinder 90 is pivotally connected at one end to ears 50 by a pivot pin 92. The other end of cylinder 90 is pivotally connected to a linkage shown generally at 94 which is pivotally supported at 96 to lift arm 80 to tilt the bucket 7 upon actuation of the cylinder rod within cylinder 90.

As shown in FIG. 2A, an equalizer bar 98 is pivotally connected to the support 58 by a pivot pin 100, which bar 98 is coupled at its outer ends to the track roller frames 4 in a standard manner. Pivot pin 100 extends through the L-shaped plate 74 and another vertically extending plate 102 forming a part of the support 58. In a wheel-type loader, its front axle would replace the equalizer bar 98 and could oscillate in a manner similar to the equalizer bar or be a "stiff axle".

As shown in FIGS. 2 and 5, a side plate 103 extends between support 58, casting 72 and casting 46. Side plate 103 is welded at its upper end 103a to the plate 60 along the area of the lower leg 66 and its lower end to a plate 103b, whereby box section 81 is formed.

As shown in FIGS. 2 and 2A, rail 16 has an upper plate 104 which extends horizontally in the rearward portion 12 of main frame 2 via section 104a and then vertically via section 104b. Upper plate 104 carries a support 107 to which a platform of the vehicle operator's cab 3 can be mounted, while towers 36 and 37 carry ears 107a for pivotally mounting the cab and about which the cab can pivot for access to compartment 26. Brackets 107b and 107c at the top of the main frame 2 also must mount such cab. Rail 18 has a similar upper plate as plate 104 coupled to tower 37.

FIG. 4 illustrates the rail 16 as comprising a box-section including the upper plate 104, a lower plate 106 which is common to plate 103b of box section 81, and two side plates including an inner plate 108 to which the hydraulic motor can be mounted and the outer plate 40. The casing 34 includes a plate 110 having an aperture 112 through which a tubular member 113 extends to the plate 108 which has an aperture 109. Casing 34 also includes a curved plate 114 following the curve of plate 110 shown in FIG. 2 and welded adjacent the top edge of plate 110 and along side plate 108 in the interior of the rail 16, the bottom end of plate 114 being welded to lower plate 106. A plate 116 is welded to plate 114 and upper plate 104 to strengthen this upper plate 104. A flange 120 is bolted with bolts 122 to the plate 110 and a plate 124 welded to the bottom of plate 106 for receiving additional bolts 122. A pivot shaft 126 having the flange 120 extends through aperture 112 to support pivotally track roller frame 4. Additional plates such as plate 127 may be welded to the side of rail 16 about hole 109 to strengthen the rail.

As can now be appreciated from FIG. 6, leg 64 of upright member 36 is a box 79 formed by flange 78, plate 38a, a plate 108a and plate 104b. Plate 108a is in common with, and is an upward extension of the plate 108 of side rail 16.

While the construction of the towers 36 and 37 and their relationship to the other components of the main frame 2 is believed to be apparent from the foregoing description, further amplification will now be made in the following explanation of its load-distributing function. As may be visualized with respect to FIG. 2A, in moving and lifting earth, the bucket 7 imparts high loads through lift arm 80 and cylinder 84 to the pivot pins 82 and 86. These loads will be distributed down the upright members 39 and 45 to two separate points of the track roller frames 4 and then to ground. More particularly, and with respect to tower 36, the loads at pin 82 will be distributed down the box-section 76 comprising leg 62 where they will be transferred through the pivot pin 100 and equalizer bar 98 to one area of the track roller frame. The load at pin 82 will also be distributed down leg 64 across casting 46 and along rail 16 ultimately to pivot shaft 126 and, hence, another part of the track roller frame. Similarly, loads on the pivot pin 86 will be distributed to and along legs 62 and 64 to the two areas of the track roller frame. Tower 37 distributes the loads it carries in a similar manner.

In view of the foregoing, it is readily apparent that the upright members 39 and 45 of the present invention, by distributing the loads through two different paths to ground, will reduce the amount of stress along any one path, thereby reducing the likelihood of premature failure of the various welds or components of the main frame 2 described above.

Thus, tower members 39 and 45 of A-frame construction are utilized, with legs 62 and 64 extending from implement mounting means to the portion of the frame 2 where loads from the implement 7 are distributed into the vehicle supporting means such as track roller frames 4. While the load path has been described in connection with track roller frames, for a wheel-type loader the load path would be down the upright members 39 and 45 into both the front and rear axles. Alternatively, the members 39 and 45 could be part of the front or rear frames of an articulated vehicle and the loads distributed downward into an axle or tracks and the remainder of the frame.

Furthermore, as already indicated, the legs 62,64 and 66 of the tower 36 (and 37) are of a four-sided box construction, with one of the sides of each leg being formed by the common plate or wall 60 such that this wall serves to support the legs throughout their length. In this manner, the usual gussets at the corners of an A-frame are not required.

As has also been shown, the box section 79 forming leg 64 has one side 108a that is common or part of the side plate 108 of rail 16, another side 38a that is common to another opposite side 40 of rail 16, and a third side 104b that is common to the top plate 104 of rail 16. This construction allows the box construction of leg 64 and of side rail 16 to be carried substantially throughout the full length of main frame 2 with sufficient offset between the tower member 39 supporting legs 62,64 and 66 and the side rail 16 to allow the implement supporting arm 80 to be located substantially in line with the rail 16, as may be seen in FIG. 2A. In this manner, the width of vehicle 1 can be held to a minimum dictated by the power train, and the implement forces are directed into the frame 2 in-line, thereby reducing bending moments.

The common plates or walls of uprights 39 and 45, such as 60, also reduce the number of welds that would normally be required at the transition between the towers 36 and 37 and the side rails 16 and 18. In this manner, these walls such as 60 not only result in a stronger structure, but reduce manufacturing problems both in costs and tooling.

Further, the stresses in legs 62,64 and 66 can be more easily identified so that the size and shape of the legs can be directly calculated, whereas stresses within flat plates are very difficult, if not impossible to identify. Also, the box structure of legs 62,64 and 66 provide the necessary strength to withstand and distribute the loads encountered by the vehicle 1 and implement 7 without excessive weight.

While the invention has been particularly shown and described with reference to preferred embodiments thereof, it will be understood by those skilled in the art that the foregoing and other changes in form and details may be made therein without departing from the spirit and scope of the invention.

The embodiments of the invention in which an exclusive property or privilege is claimed are defined as follows:

1. In a main frame for a loader vehicle having a triangular upright plate including a first forward leg, a second bottom leg and a third rear leg, the improvement comprising:
   (a) a plurality of first plates being shaped to provide a first box section along said first leg;
   (b) a plurality of second plates being shaped to provide a second box section along said second leg;
   (c) at least one third plate extending substantially at a right angle to said third leg; and
   (d) a plurality of fourth plates being shaped to provide a third box section with said third plate.

2. In a main frame according to claim 1 wherein said first box section further includes said upright plate of said first leg, and said second box section further includes said upright plate of said second leg.

3. In a main frame according to claim 1 further including a side rail having at least several of said fourth plates.

4. In a main frame according to claim 1 wherein said first box section and said second box section are on opposite sides of said upright plate.

5. A main frame for a loader vehicle, comprising:
   (a) a first elongated side rail having a plurality of plates providing a first box section, said first side rail having an outside, an inside and an end;
   (b) a second elongated side rail having a plurality of plates providing a second box section, said second side rail having an outside, an inside and an end;
   (c) a first loading supporting tower connected to said end of said first side rail including;
      (i) a first upright plate aligned with said outside of said first side rail,
      (ii) a second triangular upright plate having a first forward leg being adapted to provide a first box section, a second bottom leg being adapted to provide a second box section, and a third leg, and being aligned interiorly of said inside of said first side rail, and
      (iii) a plurality of plates being adapted to provide a third box section and being connected to said end of said first side rail, said first upright plate of said first tower and said second upright plate of said first tower;
   (d) means for supporting a load carrying member between said first upright plate and said second upright plate of said first tower substantially in-line with said first side rail;
   (e) a second load supporting tower connected to said end of said second side rail including;
      (i) a first upright plate aligned with said outside of said second side rail;
      (ii) a second triangular upright plate having a first forward leg being adapted to provide a first box section, a second bottom leg being adapted to provide a second box section, and a third leg, and being aligned interiorly of said inside of said second side rail, and
      (iii) a plurality of plates being adapted to provide a third box section and being connected to said end of said second side rail, said first upright plate of said second tower and said second upright plate of said second tower; and
   (f) means for supporting a load carrying member between said first upright plate and said second upright plate of said second tower substantially in-line with said second side rail.

* * * * *